(12) United States Patent
Dipnall (10) Patent No.: US 10,858,086 B2
(45) Date of Patent: Dec. 8, 2020

(54) DEVICE FOR LINEAR PROPULSION (71) Applicant: CETUS TECHNOLOGY LTD, Hampshire (GB)

(72) Inventor: David Dipnall, Hampshire (GB)

(73) Assignee: CETUS TECHNOLOGY LTD, Hampshire (GB)

( * ) Notice: Subject to any disclaimer, the term of this patent is extended or adjusted under 35 U.S.C. 154(b) by 101 days.

(21) Appl. No.: 15/753,878

(22) PCT Filed: Aug. 19, 2016

(86) PCT No.: PCT/EP2016/069736
§ 371 (c)(1),
(2) Date: Feb. 20, 2018

(87) PCT Pub. No.: WO2017/032721
PCT Pub. Date: Mar. 2, 2017

(65) Prior Publication Data
US 2019/0009874 A1    Jan. 10, 2019

(30) Foreign Application Priority Data
Aug. 21, 2015 (GB) .................................. 1514901.6

(51) Int. Cl.
*B63H 19/04* (2006.01)
*B63H 1/32* (2006.01)
(Continued)

(52) U.S. Cl.
CPC ............... *B63H 19/04* (2013.01); *B63H 1/32* (2013.01); *B63H 19/02* (2013.01); *F03B 13/14* (2013.01); *F03B 17/06* (2013.01); *Y02T 70/5236* (2013.01)

(58) Field of Classification Search
CPC . B63H 1/30; B63H 1/32; B63H 19/02; B63H 19/04; F03B 13/14; F03B 17/06;
(Continued)

(56) References Cited

U.S. PATENT DOCUMENTS

| 2,021,815 A | 11/1935 | Strout | |
| 2,520,804 A * | 8/1950 | Hollar | B63H 1/36 440/9 |
| 3,453,981 A * | 7/1969 | Gause | B63H 1/36 440/9 |

FOREIGN PATENT DOCUMENTS

| GB | 541 775 A | 12/1941 |
| JP | 58133997 A * | 8/1983 |

(Continued)

OTHER PUBLICATIONS

International Search Report and Written Opinion, PCT/EP2016/069736, dated Nov. 4, 2016, 12 pages.

*Primary Examiner* — Ajay Vasudeva
(74) *Attorney, Agent, or Firm* — Nelson Mullins Riley & Scarborough LLP; Anthony A. Laurentano (57) ABSTRACT

A device for linear propulsion (1) comprises a support structure (2) for carrying a payload, and one or more wave propulsion modules (3). The or each wave propulsion module (3) comprises a first individually-pivoted substantially planar blade (4) and a second individually-pivoted substantially planar blade (5). The first individually-pivoted substantially planar blade (4) is capable of producing a reactive force by self-attenuating by spring or dynamics of buoyancy means in response to an incoming fluid flow in the horizontal plane (6). The second individually-pivoted substantially planar blade (5) is capable of producing a reactive force by self-attenuating by spring or dynamics of buoyancy means in response to an incoming fluid flow in the vertical plane (7).

9 Claims, 6 Drawing Sheets

(51) Int. Cl.
*F03B 17/06* (2006.01)
*B63H 19/02* (2006.01)
*F03B 13/14* (2006.01)

(58) Field of Classification Search
CPC ............. F03B 17/061; F05B 2240/931; Y02T 70/5236; Y02T 70/59
USPC ...................................................... 440/9, 10
See application file for complete search history.

(56) References Cited

FOREIGN PATENT DOCUMENTS

| WO | WO-8001674 A1 * | 8/1980 | ............. B63H 19/02 |
| WO | 96/28657 A1 | 9/1996 | |
| WO | 2015/003261 A1 | 1/2015 | |

\* cited by examiner

DEVICE FOR LINEAR PROPULSION

RELATED APPLICATIONS

This application is a 35 U.S.C. 371 national stage filing of International Application PCT/EP2016/069736, filed 19 August 2016, which claims priority to GB 1514901.6 filed on 21 August 2015 in Great Britain. The contents of the aforementioned applications are hereby incorporated by reference.

FIELD OF THE INVENTION

The present invention relates to a device for linear propulsion that efficiently extracts energy from omnidirectional fluid flow by simultaneously converting energy from fluid movement in both the vertical and horizontal planes into useful propulsion.

BACKGROUND OF THE INVENTION

Numerous devices have been developed with the aim of utilising energy contained within marine wave environments. Such devices are designed to convert the energy contained in wave systems into useful thrust, to be used either in rotating shafts in order to pump water or generate electricity or in providing linear thrust to propel marine craft.

The majority of such devices have focused on capturing the energy contained in the movement of water in the vertical plane. This is not surprising, since the vertical movement of wave motion, at the water's surface, is the most apparent to the observer.

However, it is now understood that this vertical movement of water represents less than half of the energy contained in wave motion, especially when larger waves approach shelving shorelines.

Waves occur when otherwise static water mass is disturbed, either by tidal movement, seismic disturbance, or by friction with moving air (wind). In all cases, wave motion is created when water is 'pushed' to form peaks in response to the motivating force.

The water particles that form these peaks collapse under gravitational force, forcing adjacent particles to repeat the wave formation, following a curved trajectory that is circular in its simplest form. A simple example of this circular radiating wave is represented by the waveform generated when a stone is thrown into a still pond.

In slow motion, the stone displaces water radially as it hits the surface (i.e. the water has to move aside to allow the stone to enter the water volume), causing the first radial wave. Then, as the stone moves on downwards, the surrounding water has to return to the void created by the sinking stone. This creates the central upward 'splash', which then collapses, causing a second radial wave.

The central disturbance gradually dissipates, and the radial waves die out as they move further and further away from the source. Their eventual demise is a product both of the increasing circumference of the circular form of the wave (whereby it can only contain a diminishing amount of the original energy that produced it), and the frictional force within the water particle movement, which is converted into heat.

The movement of a water particle in response to this radial wave is essentially circular and co-planar with a radial line from the origin.

It can easily be appreciated that, if there is more than one source of wave propagation (i.e. several stones thrown into the pond, at different locations, and of different sizes), then the water particle has to respond to multiple inputs at the same time, as there will be multiple radial wave-forms passing and crossing each other as they radiate.

Its path then becomes extremely complex as it transmits the energies contained by each separate wave motion simultaneously. (In much the same way as the atmosphere is able to transmit innumerable different radio and television programmes with high fidelity, all on different wavelengths).

In the open sea, wind-driven waves are produced from many different sources, some local and some very distant. Tidal currents, and/or seabed topography may further modify such wave motion.

When observed from the shoreline (where most lay observers are located), waves appear to form regularized linear forms, giving rise to lines of surf which are usually at shallow angles, or parallel to the shore. It is important to understand that these conditions are produced locally by the wave-form interacting with the rising seabed, and are not representative of conditions in the open sea. The trajectories of water particles in such conditions may best be described as both chaotic (non-predictive) and omnidirectional.

The above analysis of wave motion is a key element in understanding why it is necessary for any device that is designed to capture and convert the energy from wave motion into useful energy to deploy elements in both the vertical and to horizontal planes, so that it achieves maximum efficiency. Since the objective of any such device is to convert a proportion of the kinetic energy contained in the movement of water particles, it follows that the device must offer a resistive force that interacts with a water particle's movement in any plane. Correspondingly, any single-plane propulsive device will not convert energy from water flows that are co-planar with the device.

This new understanding contradicts the erroneous prejudice in the technical field that "since waves move up-and-down, utilisation of the energy they contain is best achieved by apparatus that interacts with this vertical movement to extract energy".

The present inventor has previously conducted comprehensive analyses of water particle movement in complex wave environments, establishing that such movement was from all directions, in all planes, and should be described as both omnidirectional and chaotic.

The above described analyses led to the development of the devices that harvested energy from omnidirectional flow input as described in the PCT patent applications published as WO 94/10029 and WO 96/28657. Novel blade assemblies that have resultant forces produced thereon when placed in flows of fluid, particularly turbulent flows such as those experienced in wave environments, are described in WO 94/10029. The assemblies described therein are suitable for both linear and rotary applications, and have been successfully applied to both applications during comprehensive testing. However, while the resultant forces can be used to produce propulsion for a vessel or the like, the patent publication mainly focuses on the use of such forces for the purpose of power generation. Improvements to such assemblies are described in WO 96/28657, especially with regard to their use in producing power for electrical generation or pumping tasks.

Therefore, there remains a need for an alternative type of blade assembly, which is specifically designed to harvest energy from omnidirectional flow input with maximum efficiency, and utilise the resultant forces to provide propulsion to a marine craft.

The present invention seeks to provide efficient energy conversion from water flows that are both chaotic and omnidirectional. It further seeks to provide an innovative solution to the design requirements for a wave-propelled sea-going apparatus that is can carry a payload, whereby the invention not only supplies the propulsive means to transport the payload, but also contributes a significant proportion of the buoyancy required to support the payload. Since the buoyancy thus employed is derived from a component that has no net drag (i.e. it produces more thrust than drag), it can be appreciated that removing or reducing the buoyancy requirement from a drag-producing hull form will increase the efficiency of the apparatus.

The buoyancy characteristics of the blade assemblies described in the prior published patent applications discussed above are simply not addressed in those documents. However, it would be apparent to the person skilled in the art that excessive positive or negative buoyancy of those blade assemblies or their component parts would be increasingly detrimental to the functionality of the assemblies.

The present invention provides not only solutions to the above detrimental effects, but also introduces specific advantages in terms of allocated buoyancy, which in turn provides numerous opportunities for completely novel solutions for both marine craft, propulsion, and/or payload assemblies, and wave and/or tidal crossover power generators.

In previous examples of marine craft, buoyancy is usually provided by a watertight hull form, a proportion of which displaces the same mass of water as the combined mass of the hull form of the craft, the payload carried, and the propulsive means. The volume of hull form that remains above the waterline is usually greater than the immersed volume, and this is usually referred to as 'reserve buoyancy'. When wave action results in variations in the water level of the surface, then the surrounding water level either 'invades' this reserve buoyancy, or falls below the 'normal' level of neutral buoyancy, resulting in the pitching and/or rolling of the vessel, often with undesirable results. This pitching and rolling also means that wave-powered devices attached to the hull form may be disadvantaged since the movement of the water relative to the hull form is lessened by the hull form moving in sympathy with the wave.

Existing marine craft utilise a variety of propulsive means, i.e. systems that provide the power to move the vessel. For example, such vessels may employ combustion engines, electric motors, sails, human energy through paddles or oars, wave-powered means, or any combination thereof, as the propulsive means.

By contrast, one of the main objectives of the present invention is to combine two of the above essential elements of a marine craft, such that the buoyancy means also provides the propulsive means, with commensurate savings in complexity, weight, and therefore costs.

SUMMARY OF THE INVENTION

In one aspect, the present invention provides a device for linear propulsion comprising a support structure for carrying a payload, and one or more wave propulsion modules, wherein the or each wave propulsion module comprises a first individually-pivoted substantially planar blade that is capable of producing a reactive force by self-attenuating in response to an incoming fluid flow in the horizontal plane, and a second individually-pivoted substantially planar blade that is capable of producing a reactive force by self-attenuating in response to an incoming fluid flow in the vertical plane.

In a preferred aspect of the invention, there is provided a pair of substantially planar blades, a first blade set in the vertical plane, when in use, and a second blade set in the horizontal plane, when in use.

Thus, the device according to the invention retains the multiple hydrodynamic blade concept of the previous energy conversion apparatus, but now separates the pivoting to means to individual operating planes (vertical and horizontal). The first blade that responds to lateral (horizontal) movement is pivoted in the vertical plane towards its forward edge, and moves laterally in response to water flows containing a lateral component. The second blade that responds to vertical movement is pivoted in the horizontal plane towards its forward edge by pivot means that, in one preferred embodiment, is formed integrally with the vertically pivoted blade. Thus, when the first blade moves laterally in response to lateral flows, then the second blade will move radially within the horizontal plane.

Preferably, each of the first blade and the second blade is provided with pivot means on an axis that is forward of the centre of lateral resistance of the blade.

According to one preferred embodiment of the invention, the first blade is provided with pivot means that is inclined forward at the top of the pivot, such that the orbit of rotation of the blade is on a forwardly-inclined plane, thereby allowing the centre of buoyancy to provide a return force when the blade is deflected by lateral flows.

According to one preferred embodiment of the invention, the axis of the pivot means for the second blade is positioned so as to pass through the structure of the first blade. In a more preferred embodiment, the axis of the pivot means for the second blade is constructed so as to transmit any positive buoyancy of the second blade to the first blade, which then transmits the combined buoyancies through the pivot means of the first blade.

Preferably, the first blade is provided with limiting means that restricts its radial movement about its pivot axis. Such restriction may be imposed by a spring return means, providing a continual and progressive return force, or by a physical stop to restrict movement to a pre-determined angle, or by positioning the centre of buoyancy above the axis of an inclined pivot.

In a preferred embodiment of the invention, the first blade is provided with limiting means comprising spring means. The blade is provided with spring means in order to return the blade to a neutral central position when the lateral component of flow ceases. This spring means also provides a resistance to the lateral flow component, which diverts the flow in a rearwards direction, resulting in a thrust component which is transmitted to the pivot means and thus to the overall structure, including the payload.

In an alternative embodiment of the invention, the first blade is provided with limiting means by means of the buoyancy of the first blade. In this embodiment, the buoyancy of the first blade is of a sufficient force means such that it restricts the blade's radial movement about its pivot axis. In this embodiment, the need for a separate mechanical spring return means is negated. Such an arrangement has the added advantage that the amount of buoyancy and the resultant limiting force is directly linked in magnitude with the scale of the blade.

Preferably, the second blade is similarly provided with limiting means that restricts its radial movement about its pivot axis. Such restriction may be imposed by a spring return means, providing a continual and progressive return force, or by a physical stop to restrict movement to a pre-determined angle.

In a preferred embodiment of the invention, the second blade is provided with limiting means comprising spring means. The blade is provided with spring means to return it to a neutral position when vertical flow components cease.

In an alternative embodiment of the invention, the second blade is provided with limiting means by means of the buoyancy of the second blade. In this embodiment, the pivot means for the second blade is positioned away from the leading edge of the blade and instead is positioned as low as is possible within the section of the blade, such that the centre of buoyancy is positioned directly above the centre of the pivot. This arrangement will provide a substantial self-centring force when subjected to deflection in the vertical plane.

The first blade is preferably constructed so as to exhibit positive buoyancy. The to advantage of providing positive buoyancy only to the first blade is to ensure that the buoyant force is transmitted through the pivot means to the remaining structure above the water, without influencing the lateral positioning of the blade itself, which is only responsive to both the wave flow input and the spring means return force. The positive buoyancy of the first blade supports the above-water structure of the payload and any necessary support structure.

As described above, in one preferred embodiment, the first blade may be constructed so that its positive buoyancy negates the need for a separate mechanical spring return means. In a particularly preferred embodiment, the first blade includes a forwardly-inclined pivot axis, such that the centre of buoyancy rotates on an inclined plane, always seeking to return to the highest point in the orbit. This embodiment has the added advantage that the buoyancy is directly linked in magnitude with the scale of the blade.

Further self-centring buoyancy may be induced by including wider sections of the blade above the waterline, which provide additional off-centre buoyancy when immersed by lateral blade movement.

In a preferred embodiment of the invention, the second blade is constructed so as to exhibit positive buoyancy. Preferably, such positive buoyancy is equally positioned about the pivot axis of the blade. In this embodiment, the centre of buoyancy acts directly through the pivot axis, at a right angle. Incorporating positive buoyancy into the second blade in addition to the first blade has the added advantage of contributing to the overall buoyancy of the device.

In an alternative embodiment of the invention, the second blade is constructed to be neutrally buoyant. In this embodiment, the centre of buoyancy of the second blade is directly above the pivot axis, in order to maintain a neutral horizontal position, which minimises any drag impediment against horizontal water flow.

As will become apparent to those skilled in the art, there will be many possible uses to for the present invention, facilitated by its function of converting chaotic energy inputs to usable thrust in a single direction.

For example, the innovative linear propulsion device of the present invention has particular application in providing a means of propulsion to marine craft. However, it is also recognized that the device of the present invention may be utilized for applications such as in wave-powered generators, pumps, and in other similar types of equipment.

Similarly, the principles herein described are applicable on a wide variety of scales, from small working models and toys, through autonomous marine craft ranging from surfboard size up to large complex multi-functional units displacing high tonnage, to large ocean-going vessels employing the propulsion units as auxiliary propulsion when at sea.

Such a large range of end uses dictates that a large range of materials may be employed in the construction of the linear propulsion devices of the present invention. Plastics materials, such as injection-moulded plastics may be used, particularly for small-scale models. Reinforced composite materials may also be utilized, particularly for medium-sized units. Metals or metal alloys, for example aluminium or steel, may also be used, particularly for large-scale devices. Accordingly, a device for linear propulsion accordingly to the present invention preferably comprises one or more materials selected from the group consisting of a plastics material, a reinforced composite material, a metal, a metal alloy, and combinations thereof.

The choice of material does not materially affect the principles of the present invention, except where the choice of a particular material's characteristics is essential to the operational dynamics of the unit.

In other words, the choice of material will most likely be made primarily to facilitate cost-effective production, as well as needing to fulfill the requirements for strength and durability in the working marine environment. Taking it as given that the chosen Material will fulfill the need to achieve the required shape, strength, and mass of the component, the physical performance of the component is not affected by the choice of construction material.

Given the large range of end uses of the linear propulsion device of the present invention, the dimensions of the blades of the wave propulsion modules, again, may include a massive range of applicable scale.

There are multiple solutions to the requirement for a plurality of buoyant thrust-producing blades. However, the determination of blade size and numbers is more influenced by an analysis of the intended working environment, i.e., the wave dynamics that are most likely to be encountered. Although the wave environment is described as being generally omnidirectional and chaotic, there is nevertheless a structure to the wave environment that is directly linked to the performance of the present invention.

Whilst the flows past any particular point may be described as omnidirectional and chaotic, for any sea state there is a 'cellular' pattern of behaviour that can be beneficially predicted. The size of this 'cell' varies in direct relationship to the size of the waves. Thus, a wave environment on a small lake subject, for example, to an average 20 mph wind will exhibit much smaller waves (and therefore 'cell' size) than open sea with an average surface wind of, for example, 30-40 mph.

The 'cell' contains a spherical volume within which the majority of the water molecules are moving in the same direction and at similar speeds. Since it is this collection of water particles (and the kinetic energy they possess), that the device of the invention intends to harness, then it follows that the size of the blades needs to correspond with the size of the average 'cell' in the intended wave environment.

Small working models up to, say, 1 metre in length, intended for use on a boating lake or similar protected environment, albeit one that has waves up to 2.5-5 cm (1-2 inches) in amplitude, might utilise blades that are less than 25 $cm^2$ in sidereal area.

Kayaks and similar small-sized craft might access blades averaging about 0.5 $m^2$, whilst larger vessels intended for use in open waters might need blades up to 2 $m^2$ and beyond.

Manufacturing considerations are as likely to influence size choices as the need to match the 'cellular' environment of the waves likely to be encountered. It should be borne in mind that a multitude of smaller blades is actually more preferable in a given area than one large blade, since the interpretation of the differences between all the force vectors in a given volume of wave action is thus more accurately achieved, resulting in a higher conversion of energy.

Whilst it is not detrimental to the performance of the invention to have blades that are smaller than the flow 'cells', it is detrimental to have blades that are larger than the likely flow cells. The reason for this is that if there are many definable 'cells' impacting on a single blade at any one time, then cells containing opposing flow vectors will cancel each other out, reducing the net thrust on the blade surface.

Further, it is desirable that the number of blade assemblies employed is such that there are equal numbers of opposing blade deflections, so as to cancel out any overall destabilizing forces on the support structure itself.

DETAILED DESCRIPTION OF THE INVENTION

The following definitions shall apply throughout the specification and the appended claims.

Within the context of the present specification, the term "comprises" is taken to mean "includes" or "contains", i.e. other integers or features may be present, whereas the term "consists of" is taken to mean "consists exclusively of".

Within the present specification, the term "about" means plus or minus 20%; more preferably plus or minus 10%; even more preferably plus or minus 5%; most preferably plus or minus 2%.

Within the context of this specification, the word "substantially" means preferably at least 90%, more preferably 95%, even more preferably 98%, most preferably 99%.

Within the present specification, the term "positively buoyant" means having a weight less than the weight of the fluid displaced. Preferably, the fluid is water, for example the fluid is sea water at ambient or usual environmental conditions. A blade constructed to be positively buoyant tends to float.

Within the present specification, the term "negatively buoyant" means having a weight more than the weight of the fluid displaced. Preferably, the fluid is water, for example the fluid is sea water at ambient or usual environmental conditions. A blade constructed to be negatively buoyant tends to sink.

Figure 1:
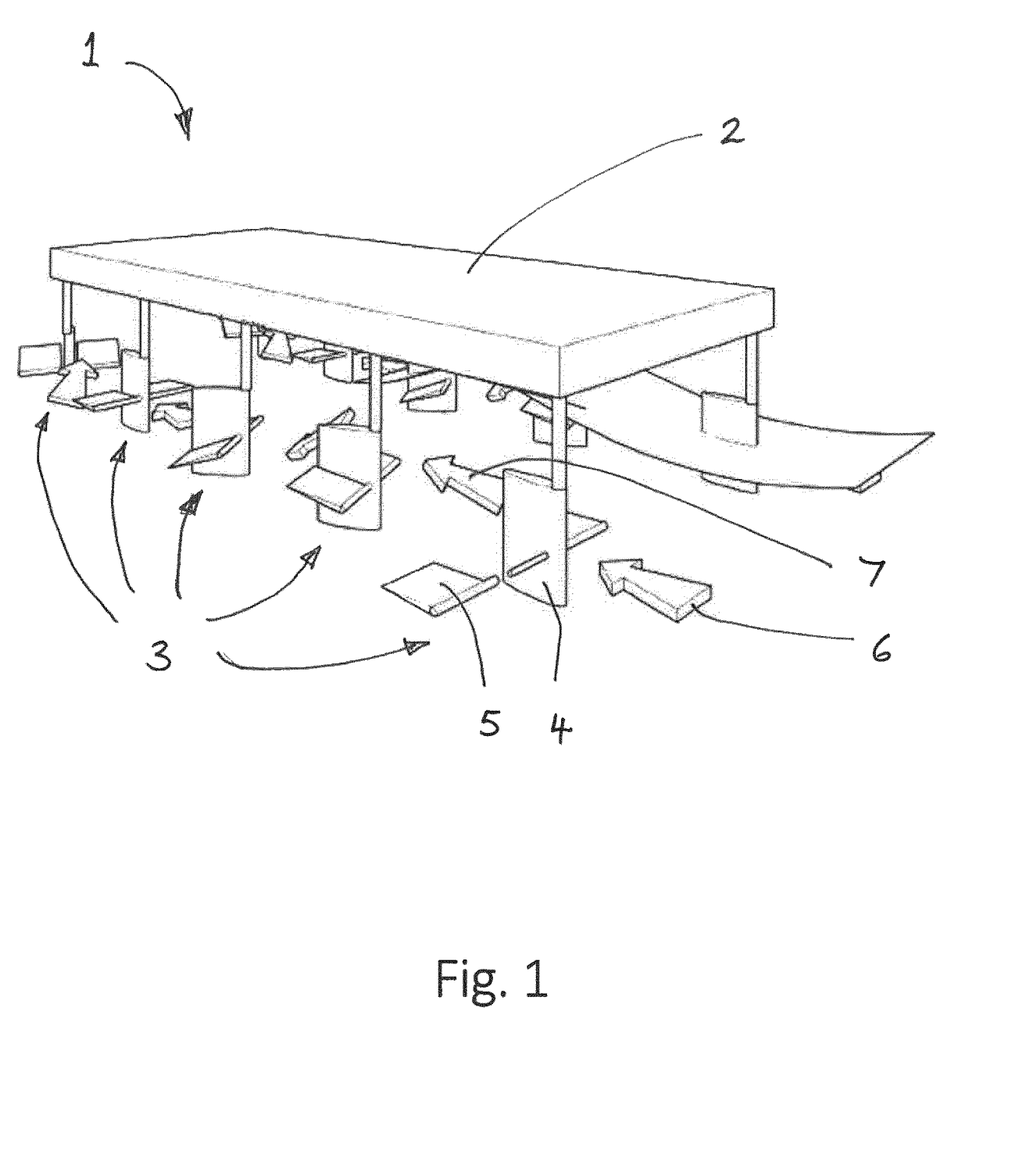
FIG. 1 shows an exemplary linear propulsion device of the invention including an array of multiple wave propulsion modules.

As shown in the accompanying drawings, in particular in FIG. 1, the device for linear propulsion (1) of the invention comprises a support structure (2) for carrying a payload (not shown), and one or more wave propulsion modules (3). Multiple wave propulsion modules are provided, each of which contributes to the dual tasks of providing buoyancy and propulsion to the payload. The buoyancy component may be either complete, whereby it provides total support for the payload and support structure, or partial, whereby it contributes to a reduction in the immersed volume of a hull form that carries the payload.

Figure 2:
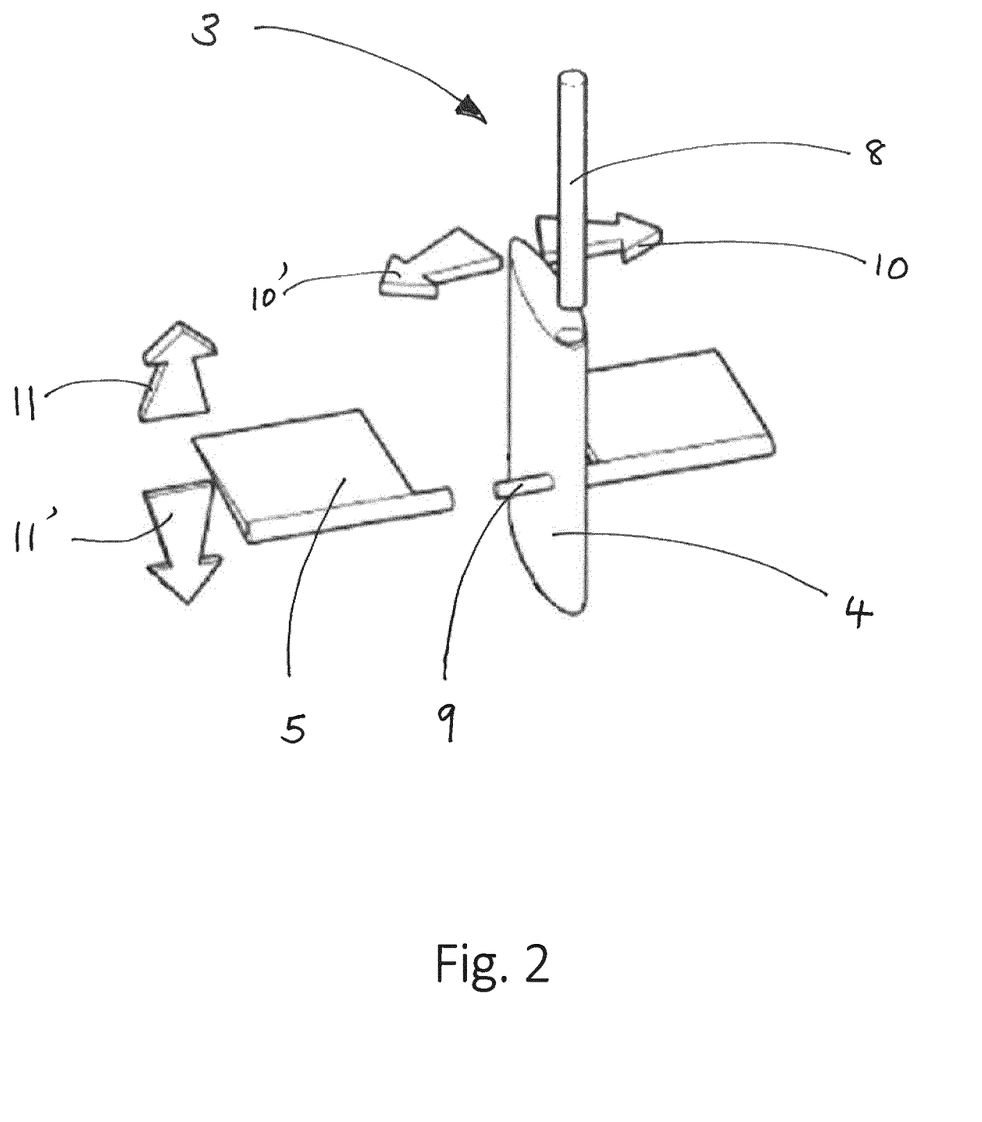
FIG. 2 shows a first embodiment of an individual wave propulsion module for use in the linear propulsion device of the invention.

As shown in FIGS. 1 and 2, each wave propulsion module comprises a first individually-pivoted substantially planar blade (4) and a second individually-pivoted substantially planar blade (5). The first individually-pivoted substantially planar blade (4) is positioned in the vertical direction when in use. This first blade is capable of producing a reactive force by self-attenuating in response to an incoming fluid flow in the horizontal plane (6). The second individually-pivoted substantially planar blade (5) is positioned in the horizontal direction when in use. This second blade is capable of producing a reactive force by self-attenuating in response to an incoming fluid flow in the vertical plane (7).

The first blade that responds to lateral (horizontal) movement is pivoted in the vertical plane towards its forward edge about a pivot means (8), and moves laterally in response to water flows containing a lateral component. The second blade that responds to vertical movement is pivoted in the horizontal plane towards its forward edge by a pivot means (9).

In the embodiments of the invention shown in the accompanying drawings, the axis of the pivot means (9) for the second blade is positioned so as to pass through the structure of the first blade (4), and is constructed so as to transmit any positive buoyancy of the second blade (5) to the first blade (4), which then transmits the combined buoyancies through the pivot means (8) of the first blade.

When a flow interacts with either the first or the second planar blade from a vector that is not co-planar with the blade, it is forced to change direction as it interacts with the blade surface. A reactive force (10, 11) is produced which moves the blade radially about its pivot axis until the spring return means or the travel stops act to provide an equal and opposite force (10', 11'). The geometry of these forces after deflection has taken place is such that a significant proportion of the resolved force is in a forward direction, and may be described as 'thrust'. Although not a functional requirement of the invention, the positioning of the two blades as close together in a fore-and aft direction as their pivot means will allow, has the effect of creating a synergy between the operation of each blade by limiting the amount of span-wise movement of flows across each blade.

Although the pivot axis of the first blade is shown in the accompanying drawings as being vertical in both front and side views, it may alternatively be angled in the side view to utilize the buoyancy force to act as a spring means to centralize the blade.

The accompanying drawings show the first blade and its pivot shaft as providing the volumetric shape to provide buoyancy. This simple hydrodynamic shape may be modified to include larger sections at the upper region of the blade to provide increased buoyancy and stability. This does not change the essential principles of the inventive concept, whereby separately pivoted planar blades operate against spring means in both horizontal and vertical planes simultaneously.

Figure 3:
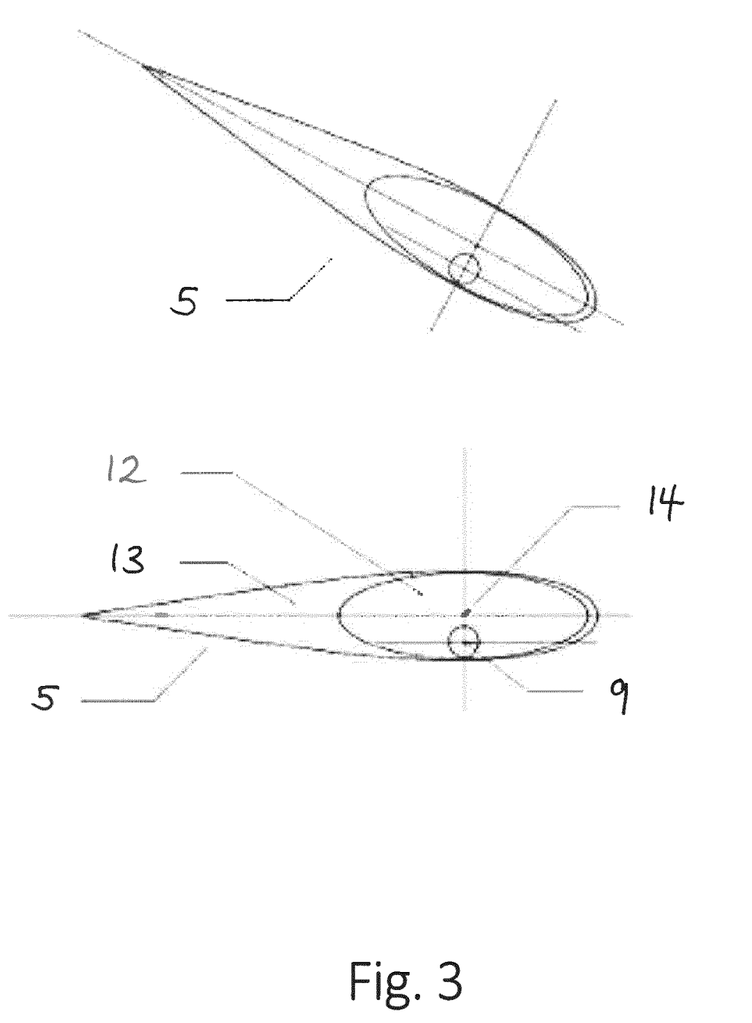
FIG. 3 shows the disposition of a horizontal blade which utilises a pivot centre which is directly underneath the centre of buoyancy of the blade.

As shown in FIG. 3 in the lower diagram, the second individually-pivoted substantially planar blade (5) is positioned in the horizontal direction when in use, and prior to any wave action. In the embodiment shown in FIG. 3, the blade includes an area of positive buoyancy (12) and an area of neutral buoyancy (13). The centre of buoyancy (14) of the second blade is positioned directly vertically above the pivot means (9), such that the blade is in a stabilised neutral position. When there is an incoming fluid flow having a component in the vertical plane, the blade is deflected as shown in the upper diagram in FIG. 3. The centre of buoyancy rotates downwards from its uppermost neutral position. Whether the blade is deflected upwards or downwards, the centre of buoyancy always acts so as to return to its neutral position, thereby producing a reactive return force.

Figure 4:
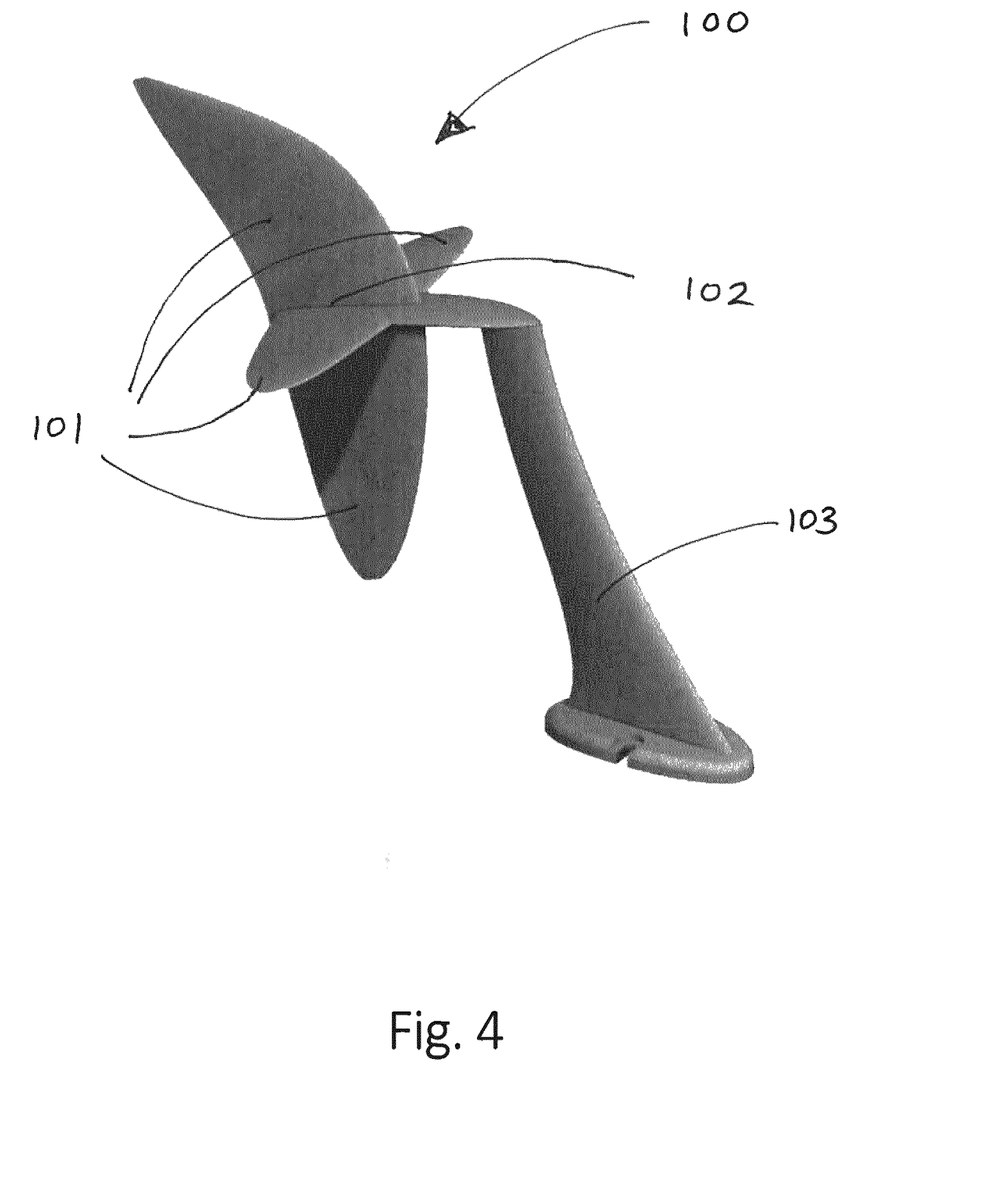
FIG. 4 shows a blade array utilised in the prior art energy conversion apparatus.

The construction of the wave propulsion modules of the linear propulsion device of the present invention as shown in FIGS. 1 and 2, incorporating separately pivoted planar blades operate against spring means in both horizontal and vertical planes simultaneously, is radically different to the blade array utilised in the prior art energy conversion apparatus shown in FIG. 4. The prior art blade array (100) includes a plurality of rigid or semi-rigid blades (101) which are of generally planar shape and are interconnected along their inner edge (102) so that the blades combine to form an integral set of blades. This set of blades is connected to a support (103) to form the blade array (100). One or more such blade arrays (100) can be incorporated into a variety of different types of energy conversion apparatus.

Figure 5:
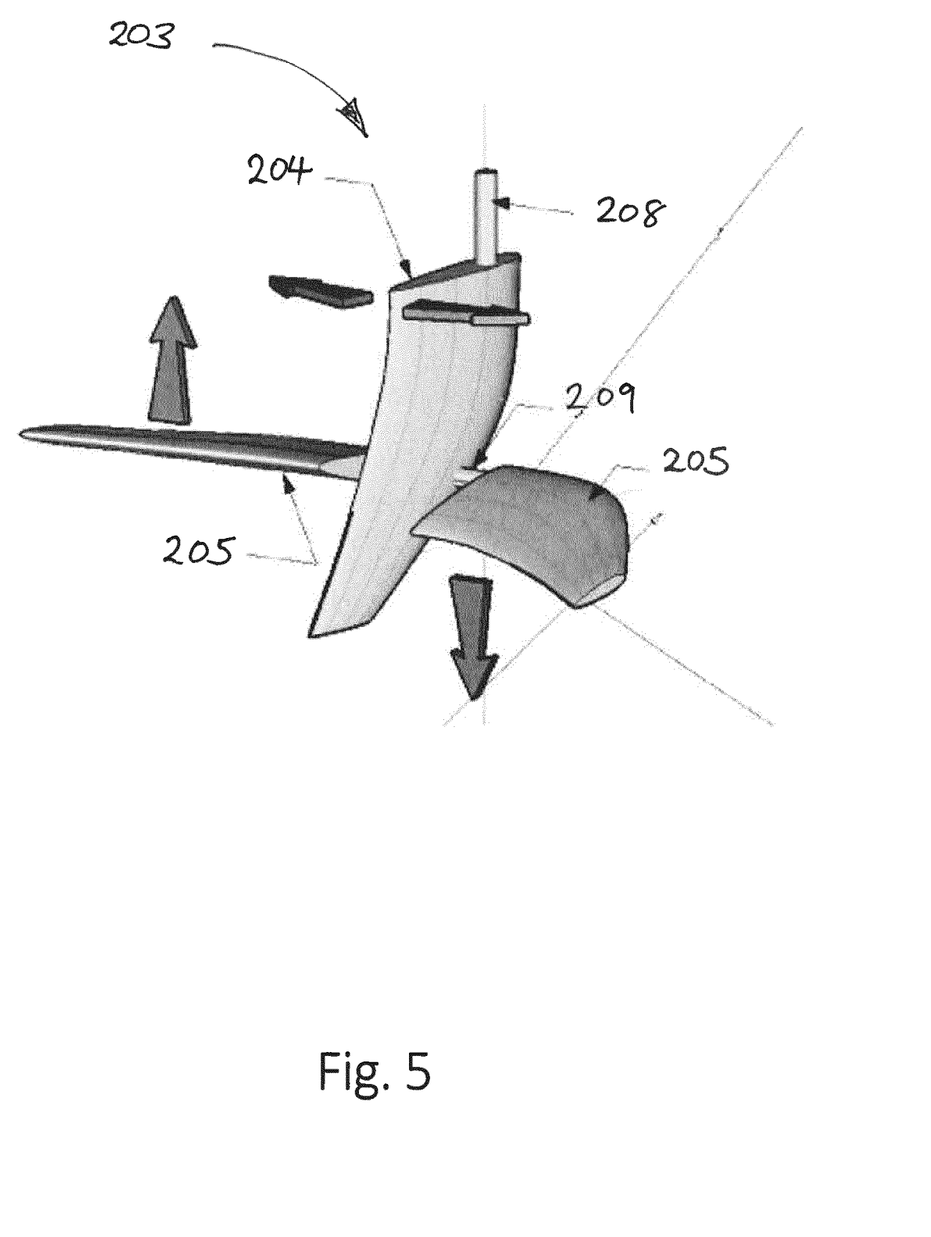
FIG. 5 shows a second embodiment of an individual wave propulsion module for use in the linear propulsion device of the invention.

An alternative embodiment of the wave propulsion module for use in the linear propulsion device of the invention is shown in FIG. 5. As for the embodiment shown in FIG. 2, the alternative wave propulsion module (203) comprises a first individually-pivoted substantially planar blade (204) and a second individually-pivoted substantially planar blade (205). In this embodiment, while both blades are substantially planar, the edges are curved.

The first individually-pivoted substantially planar blade (204) is positioned in the vertical direction and is pivoted in the vertical plane towards its forward edge about a pivot means (208). This first blade responds to lateral (horizontal) fluid flow, with the blade being deflected to port or starboard of its original neutral position.

The second individually-pivoted substantially planar blade (205) is positioned in the horizontal direction and is pivoted in the horizontal plane towards its forward edge about a pivot means (209). This second blade responds to lateral (horizontal) fluid flow, with the blade being deflected upwards in response to rising flow, and the blade being deflected downwards in response to descending flow. In the embodiment shown in FIG. 5, one half of the second blade is being deflected upwards, and the other half is being deflected downwards.

Figure 6:
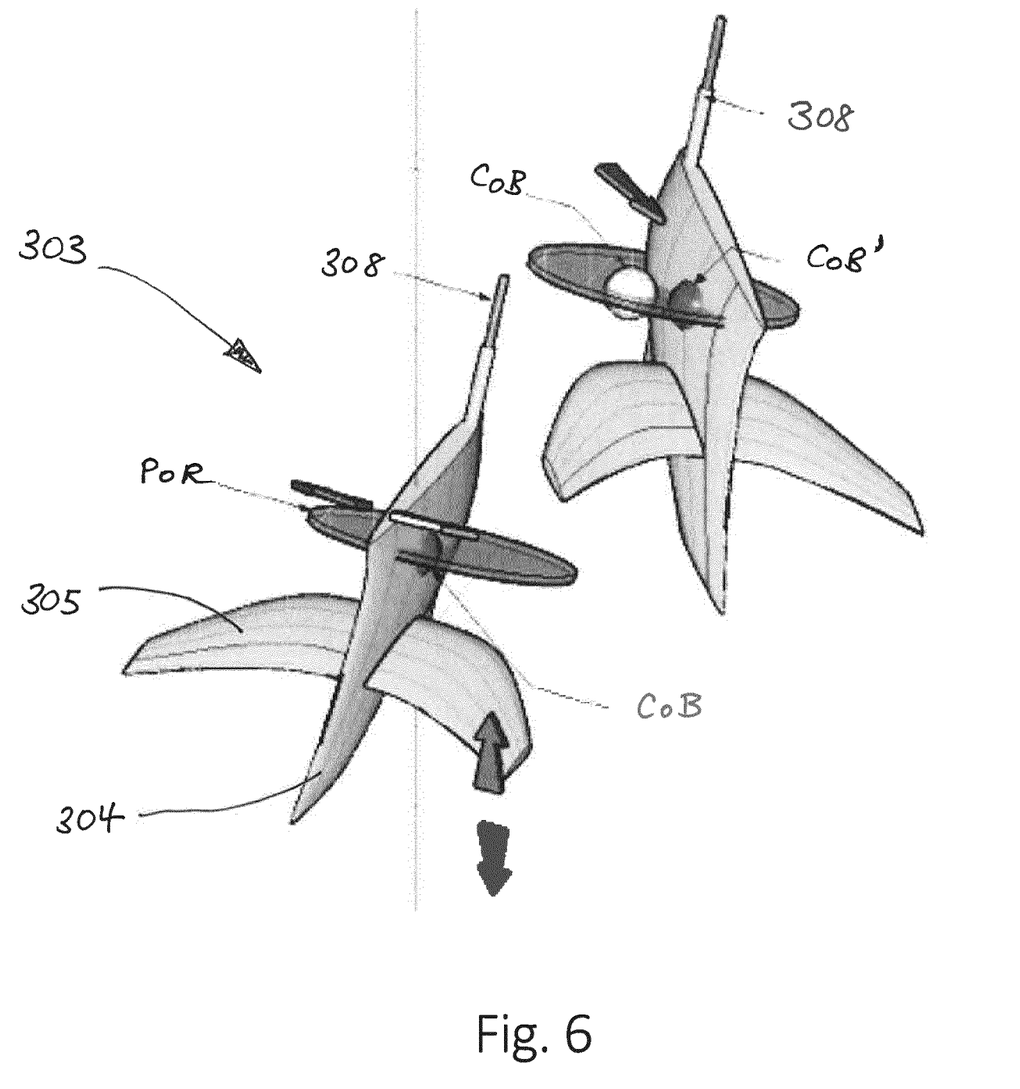
FIG. 6 shows a third embodiment of an individual wave propulsion module for use in the linear propulsion device of the invention.

A further alternative embodiment of the wave propulsion module for use in the linear propulsion device of the invention is shown in FIG. 6. As for the embodiment shown in FIG. 2, the wave propulsion module (303) comprises a first individually-pivoted substantially planar blade (304) pivoted towards its forward edge about a pivot means (308) and a second individually-pivoted substantially planar blade (305) pivoted in the horizontal plane towards its forward edge about a pivot means (309). In this embodiment, as for the embodiment shown in FIG. 5, the edges of both blades are curved.

In this particular embodiment, the pivot axis of the pivot means (308) is inclined, so that the plane of rotation PoR is also inclined. The centre of buoyancy CoB is above and behind the pivot axis when in the neutral position shown in the lower diagram. Since the centre of buoyancy will always seek the highest point on the orbit of rotation, this acts as a return force when the first blade is deflected laterally. As shown in the upper diagram in FIG. 6, the first blade is deflected from its original position in response to lateral (horizontal) fluid flow. Under such deflection, the new centre of buoyancy CoB' is now lower on the orbit of rotation, than the original rest or neutral position of the centre of buoyancy CoB, which is at the top of the orbit of rotation. Therefore, a return force is generated to bring the first blade back into its original position such that the centre of buoyancy returns to the highest point on the orbit of rotation.

If the blades are produced with negative buoyancy, then two elements of the operating dynamics have to change.

The first is that the pivot axis of the vertical blade has to be inclined backwards at the top, not forwards. This tilts the plane of rotation about the axis down at the rear, resulting in the centre of negative buoyancy always to seek the rearmost (lowest) position, and provides the blade with the requisite return force to the central position.

The second change is that the pivot axis for the horizontal blades has to be positioned directly above the centre of negative buoyancy, not below as in the positively buoyant case. The blade then acts like a weighted pendulum, and always seeks the lowest position, with the blade plane horizontal.

Multiple arrays of wave propulsion modules according to the present invention may be employed in both linear and rotary applications.

Embodiments have been described herein in a concise way. It should be appreciated that features of these embodiments may be variously separated or combined within the invention.

The invention claimed is:
1. A device for linear propulsion, comprising
a support structure for carrying a payload, and
one or more wave propulsion modules,
wherein each of the one or more wave propulsion modules includes a first individually-pivoted substantially planar blade that is capable of producing a reactive force by self-attenuating by spring or dynamics of buoyancy means in response to an incoming fluid flow in the horizontal plane, and a second individually-pivoted substantially planar blade that is capable of producing a reactive force by self-attenuating by spring or dynamics of buoyancy means in response to an incoming fluid flow in the vertical plane,
wherein the first and second blades are constructed to be positively buoyant, wherein the first blade is provided with a pivot that is inclined forward at a top of the pivot, such that an orbit of rotation of the first blade is on a forwardly-inclined plane, thereby allowing a center of positive buoyancy to provide a return force when the first blade is deflected by lateral flows, or
wherein the first and second blades are constructed to be negatively buoyant, and wherein the first blade is provided with a pivot that is inclined rearward at a top of the pivot, such that the orbit of rotation of the first blade is on a rearwardly-inclined plane, thereby allow- ing a center of negative buoyancy to provide a return force when the first blade is deflected by lateral flows.

2. A device as claimed in claim 1 wherein the first blade is provided with pivot means on an axis that is forward of a center of lateral resistance of the first blade.

3. A device as claimed in claim 1 wherein the second blade is provided with a pivot on an axis that is forward of a center of lateral resistance of the second blade.

4. A device as claimed in claim 1 wherein the second blade is mounted on a pivot attached to the first blade.

5. A device as claimed in claim 1 wherein the second blade is mounted on a pivot integrally formed with the first blade.

6. A device as claimed in claim 1 wherein the second blade is constructed so as to have neutral buoyancy.

7. A device as claimed in claim 1, wherein the combination of the second blade and the pivot is constructed so as to exhibit positive buoyancy, and wherein a center of positive buoyancy is vertically above a pivot axis of the blade, and forward of a center of lateral resistance in the vertical plane.

8. A device as claimed in claim 1, wherein the combination of the second blade and the pivot is constructed so as to exhibit negative buoyancy, and wherein a center of negative buoyancy is vertically below a pivot axis of the blade and forward of the center of lateral resistance in the vertical plane.

9. A device as claimed in claim 1 wherein the second blade is formed as an integral part of the first blade and deflects vertically in response to a vertical component of flows, the magnitude of such deflection being limited by the elastic properties of the material from which the first and second blades are formed and a disposition of variable cross-sections of each blade so as to provide a stiff and twistable leading edge, said elastic properties tending to return the first blade to a neutral rest position.

* * * * *